(12) United States Patent
Schlepple et al.

(10) Patent No.: US 11,888,527 B1
(45) Date of Patent: Jan. 30, 2024

(54) FORWARD POLARIZATION CONTROL FOR REMOTE LASER

(71) Applicant: Cisco Technology, Inc., San Jose, CA (US)

(72) Inventors: Norbert Schlepple, Macungie, PA (US); Weizhuo Li, Berkeley Heights, NJ (US); Jean-Luc J. Tambasco, Macungie, PA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 17/929,274

(22) Filed: Sep. 1, 2022

(51) Int. Cl.
*H04B 10/532* (2013.01)
*H04B 10/25* (2013.01)

(52) U.S. Cl.
CPC ........... *H04B 10/532* (2013.01); *H04B 10/25* (2013.01)

(58) Field of Classification Search
None
See application file for complete search history.

(56) References Cited

U.S. PATENT DOCUMENTS

| | | | | |
|---|---|---|---|---|
| 4,907,848 | A * | 3/1990 | Pavlath | G01D 5/34723 356/151 |
| 6,282,016 | B1 * | 8/2001 | MacCormack | H01S 3/06758 359/341.41 |
| 7,067,795 | B1 | 6/2006 | Yan et al. | |
| 2004/0184491 | A1 | 9/2004 | Wai et al. | |
| 2015/0078744 | A1 * | 3/2015 | Ito | H04B 10/2581 398/43 |
| 2020/0067626 | A1 | 2/2020 | Dupuis et al. | |
| 2021/0396508 | A1 * | 12/2021 | Herink | G01B 9/02084 |

OTHER PUBLICATIONS

Xiong Yu-Peng et al., "Adaptive Polarization Control of Fiber Amplifier Based on SPGD Algorithm," IOPScience, dated Jul. 2012 [Abstract Only].
Chollet, F. et al., "Compact Evanescent Optical Switch and Attenuator with Electromechanical Actuation," IEEE Journal of Selected Topics in Quantum Electronics, vol. 5, No. 1, Year: 1999, pp. 52-29.
Q. Xu et al., "Electrically tunable optical polarization rotation on a silicon chip using Berry's Phase," Nature Communications, dated Nov. 12, 2014, pp. 1-6.

* cited by examiner

*Primary Examiner* — David W Lambert
(74) *Attorney, Agent, or Firm* — Patterson + Sheridan, LLP

(57) ABSTRACT

A system includes an optical source, an integrated circuit, an optical fiber, and a polarization controller. The optical source is arranged emit an optical signal. The integrated circuit includes a mirror. The optical fiber carries the optical signal from the optical source to the integrated circuit. The mirror reflects a transverse magnetic component of the optical signal through the optical fiber to the optical source. The polarization controller adjusts, based on the transverse magnetic component, the optical signal emitted from the optical source such that the transverse magnetic component is reduced.

16 Claims, 8 Drawing Sheets

FORWARD POLARIZATION CONTROL FOR REMOTE LASER

TECHNICAL FIELD

Embodiments presented in this disclosure generally relate to optical communications. More specifically, embodiments disclosed herein relate to polarization control of optical signals.

BACKGROUND

Optical communications may involve a remote optical source providing a source optical signal for an integrated circuit (e.g., a photonic integrated circuit). The source optical signal may be carried by an optical fiber connecting the optical source and the integrated circuit.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

OVERVIEW

Figure 1:
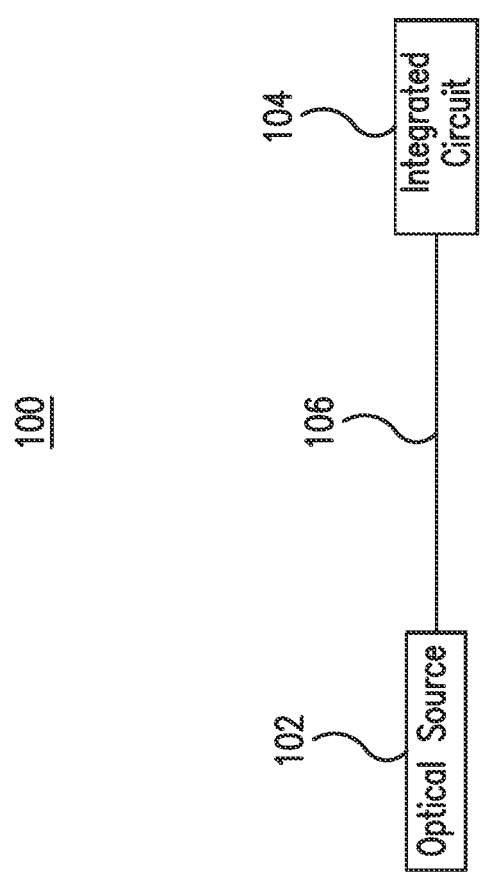
FIG. 1 illustrates an example system.

According to an embodiment, a system includes an optical source, an integrated circuit, an optical fiber, and a polarization controller. The optical source is arranged emit an optical signal. The integrated circuit includes a mirror. The optical fiber carries the optical signal from the optical source to the integrated circuit. The mirror reflects a transverse magnetic component of the optical signal through the optical fiber to the optical source. The polarization controller adjusts, based on the transverse magnetic component, the optical signal emitted from the optical source such that the transverse magnetic component is reduced.

According to another embodiment, a system includes an optical source, an integrated circuit, an optical fiber, and a polarization controller. The optical source includes a polarization controller. The optical fiber carries an optical signal emitted from the optical source to the integrated circuit through a first core of the optical fiber. A second core of the optical fiber carries a transverse magnetic component of the optical signal from the integrated circuit to the optical source. The polarization controller adjusts, based on the transverse magnetic component of the optical signal, the optical signal emitted from the optical source such that the transverse magnetic component is reduced.

According to another embodiment, a method includes emitting, by an optical source, an optical signal. The optical source includes a polarization controller. The method also includes carrying, by an optical fiber, the optical signal from the optical source to an integrated circuit. The integrated circuit includes a mirror. The method further includes reflecting, by the mirror, a transverse magnetic component of the optical signal through the optical fiber to the optical source and adjusting, by the polarization controller and based on the transverse magnetic component, the optical signal emitted from the optical source such that the transverse magnetic component is reduced.

EXAMPLE EMBODIMENTS

Optical communications may involve a remote optical source providing a source optical signal for an integrated circuit (e.g., a photonic integrated circuit). The source optical signal may be carried by an optical fiber connecting the optical source and the integrated circuit. Polarization maintaining fibers are growing in popularity because these fibers maintain a linear polarization of the optical signal. Polarization maintaining fibers, however, present several drawbacks. For example, polarization maintaining fibers may be difficult to install correctly. It may be difficult to properly terminate a polarization maintaining fiber. If the orientation, rotation, or alignment of the polarization maintaining fiber is off, then optical losses may occur. Additionally, due to these difficulties, polarization maintaining fibers may cost ten times as much to produce and install than non-polarization maintaining fibers.

This disclosure contemplates a process for compensating for polarization changes in an optical fiber that is used to carry optical signals from an optical source to an integrated circuit. The integrated circuit includes a polarization beam splitter that splits the optical signal into its transverse electric and transverse magnetic components. The transverse magnetic component is then used by the optical source to determine how to adjust the optical signal so as to reduce, minimize, or eliminate the transverse magnetic component. In this manner, the optical system self-corrects for changes to the polarization of the optical signal that occur in the optical fiber (e.g., because a non-polarization maintaining fiber was used rather than a polarization maintaining fiber), in certain embodiments.

FIG. 1 illustrates an example system 100. As seen in FIG. 1, the system 100 includes an optical source 102, an integrated circuit 104, and an optical fiber 106. Generally, the optical source 102 provides a source optical signal to the integrated circuit 104 through the optical fiber 106. The optical fiber 106 may be a single mode fiber (e.g., a non-polarization maintaining fiber or a polarization maintaining fiber) that causes the polarization of the optical signal to change (e.g., causing the optical signal to have a transverse magnetic component) as the optical signal travels through the optical fiber. In certain embodiments, the optical source 102 automatically adjusts a polarization of the emitted optical signal to correct or reduce a transverse magnetic component of the optical signal present at the integrated circuit 104. For example, the optical source 102 may adjust the polarization of the emitted optical signal until the transverse magnetic component is minimized or eliminated.

The optical source 102 includes any suitable components for generating and emitting an optical signal. For example, the optical source 102 may include a laser that generates an optical signal. The optical source 102 may also include other optical components, such as coupling optics and an optical isolator, that focus or direct the optical signal towards the optical fiber 106. The optical source 102 also includes a polarization controller that automatically adjusts a polarization of the optical signal before the optical signal is emitted onto the optical fiber 106. In certain embodiments, the polarization controller adjusts the polarization of the optical signal to reduce a transverse magnetic component of the optical signal at the integrated circuit 104. The polarization controller may adjust the polarization of the optical signal such that the transverse magnetic component is minimized or eliminated.

The optical fiber 106 may be any suitable optical fiber that carries the optical signal from the optical source 102 to the integrated circuit 104. The optical fiber 106 may be a single mode fiber and may include any suitable number of cores. The optical fiber 106 may be a polarization maintaining fiber or a non-polarization maintaining fiber. In some embodiments, an optical connector may connect an optical fiber 106 from the optical source 102 to an optical fiber 106 from the integrated circuit 104, to effectively create a single optical fiber 106. For example, the optical fiber 106 from the optical source 102 may terminate at one optical connector, and the optical fiber 106 from the integrated circuit 104 may terminate at another optical connector. These two optical connectors may physically connect to each other to connect the optical fibers 106 from the optical source 102 and the integrated circuit 104. The optical signal may then pass through the optical fibers 106 and the optical connectors.

The integrated circuit 104 may be any suitable photonic integrated circuit that receives the optical signal from the optical source 102. In some embodiments, the integrated circuit 104 splits the optical signal into transverse electric and transverse magnetic components. The integrated circuit 104 may process or use the transverse electric component. For example, the integrated circuit 104 may transmit the transverse electric component. The integrated circuit 104 may communicate the transverse magnetic component back to the optical source 102. For example, the integrated circuit 104 may include a mirror that reflects the transverse magnetic component back to the optical source 102 over the optical fiber 106. As another example, the integrated circuit 104 may communicate the transverse magnetic component to the optical source 102 over another core of the optical fiber 106, different from the core used to communicate the optical signal from the optical source 102 to the integrated circuit 104. In this manner, the integrated circuit 104 sends the transverse magnetic component of the optical signal back to the optical source 102 using the same optical fiber 106 that was used to carry the optical signal from the optical source 102 to the integrated circuit 104.

Figure 2:
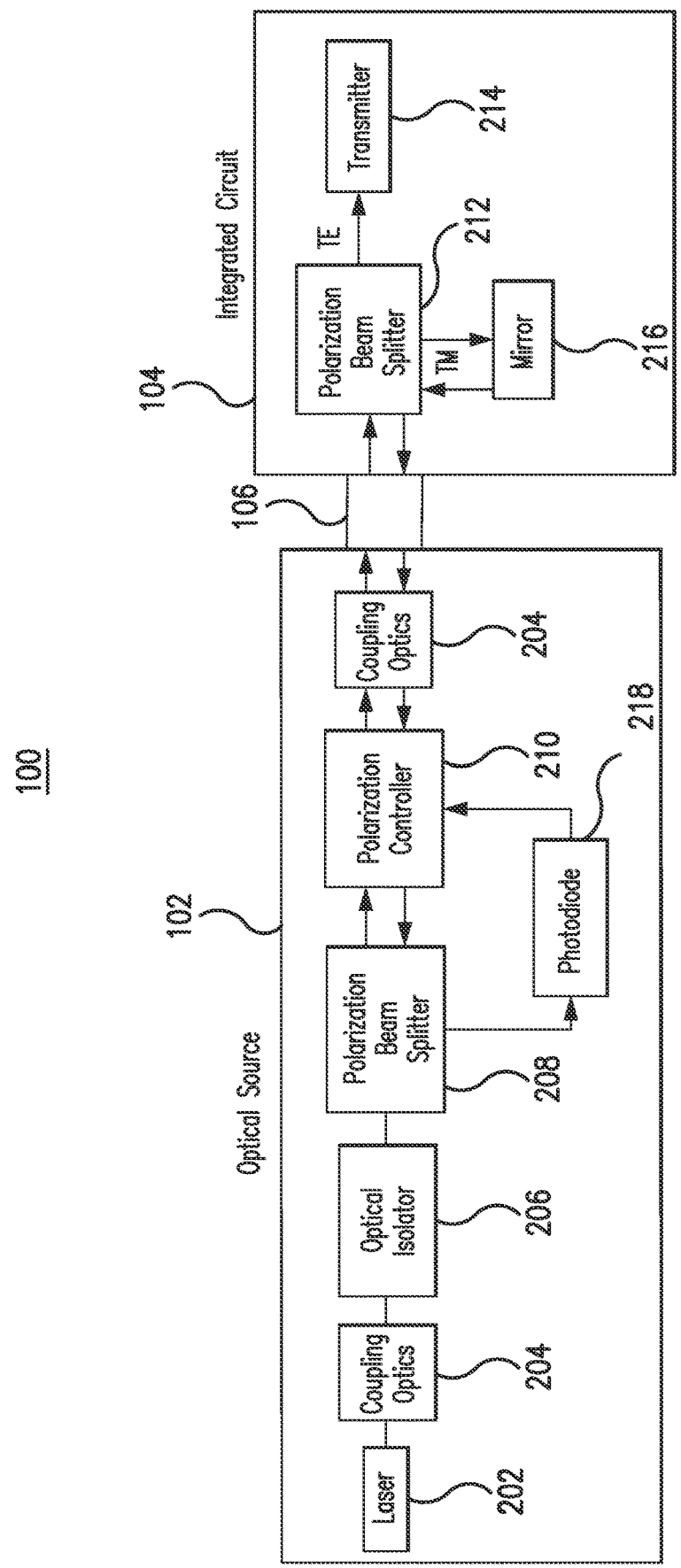
FIG. 2 illustrates an example implementation of the system of FIG. 1.

FIG. 2 illustrates an example implementation of the system 100 of FIG. 1. As seen in FIG. 2, the system 100 includes the optical source 102, the integrated circuit 104, and the optical fiber 106. In the example of FIG. 2, the optical fiber 106 may be a single core optical fiber. The integrated circuit 104 may reflect the transverse magnetic component of the optical signal to the optical source 102 over the optical fiber 106. The optical source 102 may then adjust the polarization of the optical signal to reduce, minimize, or eliminate the transverse magnetic component. As a result, the same optical fibers 106 is used to carry the optical signal from the optical source 102 to the integrated circuit 104 and to carry the transverse magnetic component of the optical signal from the integrated circuit 104 to the optical source 102.

Generally, the optical source 102 may include any suitable mechanism for generating or producing the optical signal. In the example of FIG. 2, the optical source 102 includes a laser 202 (e.g., a laser diode) that generates or produces the optical signal. The laser diode may generate or produce the optical signal when electrical power is applied to the laser diode.

The laser 202 directs the optical signal to other optical components in the optical source 102. As seen in FIG. 2, the optical source 102 may include coupling optics 204 and an optical isolator 206. The coupling optics 204 may focus or direct the optical signal from the laser 202. The optical isolator 206 directs the optical signal from the coupling optics 204 in a particular direction. In certain embodiments, the optical isolator 206 directs the optical signal such that the optical signal propagates in only one direction.

The optical source 102 also includes a polarization beam splitter 208. The optical isolator 206 may direct the optical signal to the polarization beam splitter 208. The polarization beam splitter 208 may split an optical signal based on its polarization. In some embodiments, the polarization beam splitter 208 splits the reflected optical signal from the integrated circuit 104.

The polarization controller 210 adjusts the polarization of optical signals passing through the polarization controller 210. In some embodiments, the polarization controller 210 adjusts the polarization of the optical signal generated by the optical source 102 to reduce a transverse magnetic component of that optical signal when received at the integrated circuit 104. The polarization controller 210 may also apply the reciprocal polarization adjustment to the reflected transverse magnetic component of the optical signal from the integrated circuit 104. The polarization controller 210 may include any suitable components for adjusting the polarization of optical signals passing through the polarization controller 210. After adjusting the polarization of the optical signal generated by the optical source 102, the polarization controller 210 directs or emits the optical signal onto the optical fiber 106. In some embodiments, additional coupling optics 204 are positioned between the polarization controller 210 and the optical fiber 106. The coupling optics 204 focus or direct the optical signal from the polarization controller 210 onto the optical fiber 106. The optical fiber 106 then carries the optical signal to the integrated circuit 104.

In some embodiments, the polarization controller 210 is separate from the optical source 102 and positioned between the optical source 102 and the optical fiber 106. The optical source 102 emits the optical signal to the polarization controller 210, and the polarization controller 210 adjusts the polarization of the optical signal before directing the optical signal onto the optical fiber 106.

The optical fiber 106 carries the optical signal produced by the optical source 102 to the integrated circuit 104. The optical fiber 106 also carries the reflected transverse magnetic component from the integrated circuit 104 to the optical source 102. The polarization of the optical signal emitted by the optical source 102 may change when propagating through the optical fiber 106. Additionally, as the transverse magnetic component propagates through the optical fiber 106, the polarization of the transverse magnetic component may experience a reciprocal change relative to the polarization change that occurs to the optical signal emitted by the optical source 102. As discussed previously, in certain embodiments, the optical fiber 106 may be split and one or more optical connectors may connect the split ends of the optical fiber 106, to form an optical connection between the optical source 102 and the integrated circuit 104.

The integrated circuit 104 includes a polarization beam splitter 212 that receives the optical signal from the optical fiber 106. The polarization beam splitter 212 splits the optical signal received at the integrated circuit 104 into its transverse electric (TE) and transverse magnetic (TM) components. Even though the optical signal emitted by the optical source 102 may not have had a transverse magnetic component, the optical signal received at the integrated circuit 104 may have a transverse magnetic component because the optical fiber 106 may have changed or adjusted the polarization of the optical signal as the optical signal propagated through the optical fiber 106.

The integrated circuit 104 may process or use the transverse electric component of the optical signal in any suitable manner. In the example of FIG. 2, the integrated circuit 104 includes a transmitter 214 that receives the transverse electric component of the optical signal from the polarization beam splitter 212. The transmitter 214 may transmit the transverse electric component of the optical signal to other components.

The integrated circuit 104 includes a mirror 216 that reflects the transverse magnetic component of the optical signal back onto the optical fiber 106. As the transverse magnetic component of the optical signal propagates through the optical fiber 106, the polarization of the transverse magnetic component may be adjusted in a manner that is reciprocal to the polarization adjustment that occurred to the optical signal from the optical source 102 as the optical signal propagated through the optical fiber 106. In this manner, the optical fiber 106 carries both the optical signal from the optical source 102 to the integrated circuit 104 and the transverse magnetic component of the optical signal from the integrated circuit 104 to the optical source 102. In some embodiments, the mirror 216 is a Bragg reflector. In certain embodiments, the mirror 216 is a loop.

The polarization controller 210 receives the transverse magnetic component of the optical signal (with the reciprocal polarization adjustment). The polarization controller 210 then directs the transverse magnetic component of the optical signal to the polarization beam splitter 208. The polarization controller 210 may adjust the polarization of the transverse magnetic component of the optical signal in a manner that is reciprocal to the polarization adjustment that the polarization controller 210 made to the optical signal generated by the optical source 102. In some embodiments, after applying the reciprocal polarization adjustment in the polarization controller 210, the transverse magnetic component is a clean transverse magnetic component.

The polarization beam splitter 208 splits the beam from the polarization controller 210 and directs part of the split beam to the photodiode 218. In some embodiments, the polarization beam splitter 208 directs the transverse magnetic component to the photodiode 218. The photodiode 218 detects the optical beam from the polarization beam splitter 208 and generates an electric signal representing that optical beam. For example, the polarization beam splitter 208 may direct the transverse magnetic component to the photodiode 218. The photodiode 218 may then generate an electric signal representing the transverse magnetic component. The photodiode 218 directs the electrical signal to the polarization controller 210.

The polarization controller 210 uses the electric signal to determine how to adjust the polarization of the optical signal generated by the optical source 102. For example, the polarization controller 210 may use the electric signal to determine the size or magnitude of the transverse magnetic component. The polarization controller 210 may then adjust the polarization of the optical signal to counter or compensate for the polarization change that occurs in the optical fiber 106. As a result, the polarization controller 210 adjusts the polarization of the optical signal so that the transverse magnetic component at the integrated circuit 104 is reduced, minimized, or eliminated. For example, the polarization controller 210 may adjust the polarization of the optical signal until a voltage or current of the electric signal from the photodiode 218 is reduced below a threshold or is reduced to zero. In this manner, the optical source 102 automatically adjusts the polarization of the optical signal to reduce, minimize, or eliminate a transverse magnetic component that may appear at the integrated circuit 104, in certain embodiments.

Figure 3:
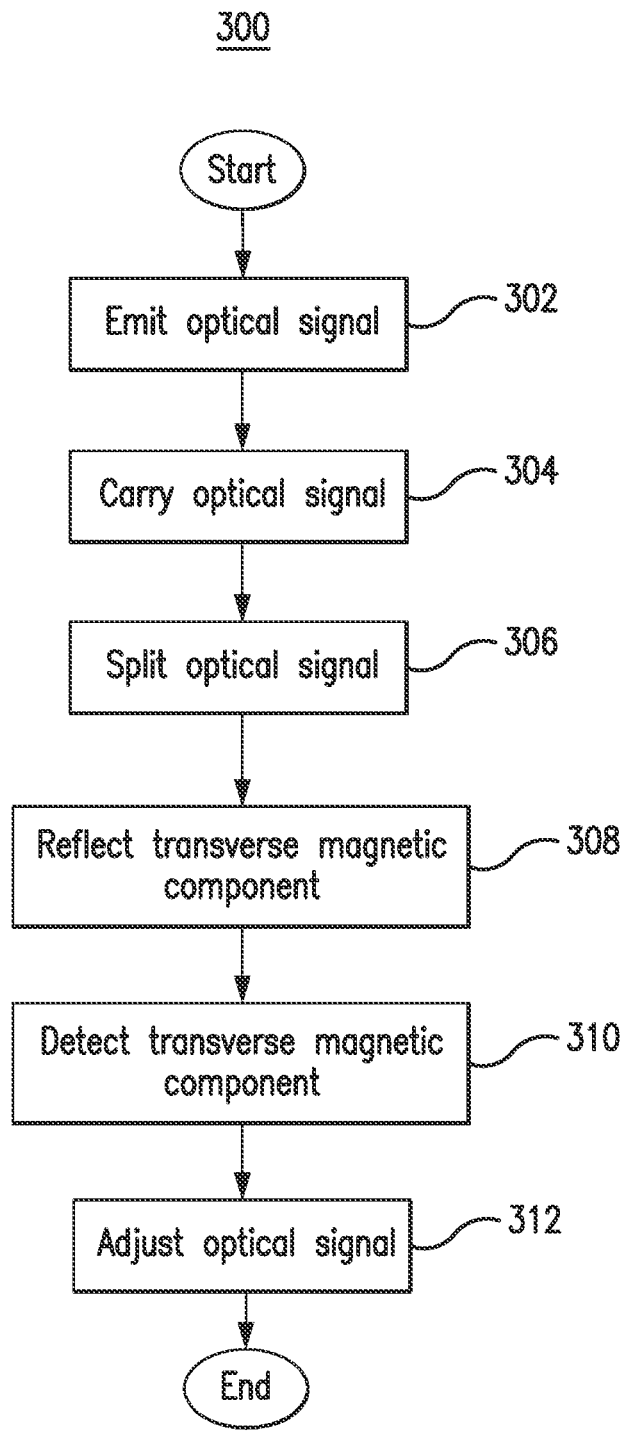
FIG. 3 is a flowchart of an example method performed in the system of FIG. 1.

FIG. 3 is a flowchart of an example method 300 performed in the system 100 of FIG. 1. In particular embodiments, various components of the system 100 perform the method 300. By performing the method 300, the optical system 100 automatically adjusts the polarization of an optical signal to compensate or correct for polarization changes that occur over the optical fiber 106.

In block 302, the optical source 102 emits an optical signal. The optical source 102 may include a laser 202 and other optical components that generate and direct the optical signal to the optical fiber 106. The optical source 102 emits the optical signal over the optical fiber 106. The optical fiber 106 then carries the optical signal to the integrated circuit 104 in block 304. As the optical signal propagates over the optical fiber 106, the polarization of the optical signal may change. For example, if the optical fiber 106 is a non-polarization maintaining fiber, then the polarization of the optical signal may change as the optical signal propagates through the optical fiber 106 to the integrated circuit 104.

In block 306, the polarization beam splitter 212 of the integrated circuit 104 receives and splits the optical signal from the optical fiber 106. For example, the polarization beam splitter 212 may split the optical signal into transverse electric and transverse magnetic components. As discussed previously, the optical signal may have a transverse magnetic component because the polarization of the optical signal changed as the optical signal propagated over the optical fiber 106. The polarization beam splitter 212 may direct the transverse electric and transverse magnetic components of the optical signal to different components in the integrated circuit 104. For example, the polarization beam splitter 212 may direct the transverse electric component to the transmitter 214 and the transverse magnetic component to the mirror 216.

In block 308, the mirror 216 reflects the transverse magnetic component of the optical signal back to the optical fiber 106. The optical fiber 106 then carries the transverse magnetic component of the optical signal back to the optical source 102. In some embodiments, the optical fiber 106 carries the transverse magnetic component using the same core that was used to carry the optical signal from the optical source 102 to the integrated circuit 104. Additionally, the optical fiber 106 may change the polarization of the transverse magnetic component in a manner that is reciprocal to the polarization change that occurred to the optical signal as the optical signal traveled from the optical source 102 to the integrated circuit 104.

In block 310, the photodiodes 218 detect the transverse magnetic component. For example, the polarization controller 210 may receive the transverse magnetic component from the optical fiber 106. The polarization controller 210 may adjust the polarization of the transverse magnetic component in a manner that is reciprocal to the polarization adjustment made to the optical signal produced by the optical source 102. The polarization beam splitter 208 in the optical source 102 then splits or directs the transverse magnetic component to the photodiode 218. The photodiode 218 detects the transverse magnetic component and generates an electric signal according to the transverse magnetic component. The photodiode 218 communicates the electric signal to the polarization controller 210.

In block 312, the polarization controller 210 adjusts the optical signal to reduce, minimize, or eliminate the transverse magnetic component at the integrated circuit 104. The polarization controller 210 analyzes or processes the electric signal from the photodiode 218 to determine how to adjust the polarization of the optical signal generated by the optical source 102. For example, the polarization controller 210 may adjust the polarization of the optical signal, to reduce, minimize, or eliminate the transverse magnetic component at the integrated circuit 104, in certain embodiments. The polarization controller 210 then makes the adjustment to the polarization of the optical signal before the optical signal is emitted onto the optical fiber 106.

Figure 4:
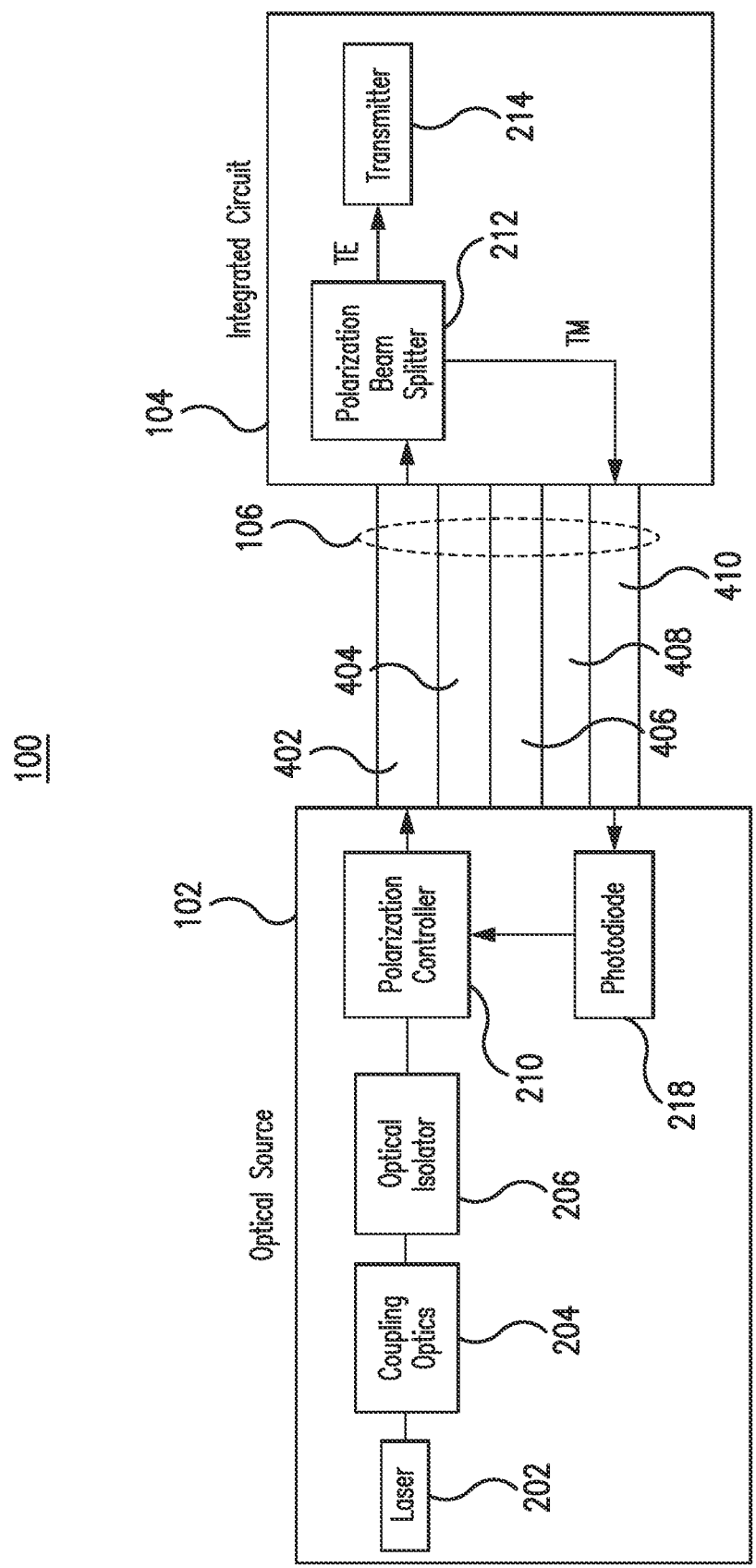
FIG. 4 illustrates an example implementation of the system of FIG. 1.

FIG. 4 illustrates an example implementation of the system 100 of FIG. 1. As seen in FIG. 4, the system 100 includes the optical source 102, the integrated circuit 104, and the optical fiber 106. The optical fiber 106 in the example of FIG. 4 includes multiple cores. The optical signal emitted by the optical source 102 may propagate through one core of the optical fiber 106, while the transverse magnetic component at the integrated circuit 104 may be communicated back to the optical source 102 using a different core.

Similar to the example of FIG. 2, the optical source 102 includes a laser 202, coupling optics 204, an optical isolator 206, and a polarization controller 210 that produce and emit an optical signal. The polarization controller 210 may emit the optical signal onto the optical fiber 106. The optical fiber 106 then carries the optical signal to the integrated circuit 104. As with previous examples, the polarization controller 210 may adjust the polarization of the optical signal before emitting the optical signal onto the optical fiber 106.

In some embodiments, the polarization controller 210 is separate from the optical source 102 and positioned between the optical source 102 and the optical fiber 106. The optical source 102 emits the optical signal to the polarization controller 210, and the polarization controller 210 adjusts the polarization of the optical signal before directing the optical signal onto the optical fiber 106.

As seen in FIG. 4, the optical fiber 106 includes multiple cores 402, 404, 406, 408, and 410. The optical fiber 106 may include any suitable number of cores. Additionally, the optical fiber 106 may be split and one or more optical connectors may connect the split ends of the optical fiber 106. The different cores 402, 404, 406, 408, and 410 of the optical fiber 106 may carry different optical signals. In the example of FIG. 4, the core 402 of the optical fiber 106 carries the optical signal emitted by the polarization controller 210 to the integrated circuit 104.

The integrated circuit 104 includes the polarization beam splitter 212 that receives the optical signal over the core 402. The polarization beam splitter 212 splits the optical signal into its transverse electric (TE) and transverse magnetic (TM) components. As with previous examples, as the optical signal travels through the core 402, the polarization of the optical signal may change such that the optical signal includes transverse electric and transverse magnetic components. The polarization beam splitter 212 directs the transverse electric component of the optical signal to another component, such as the transmitter 214. The polarization beam splitter 212 directs the transverse magnetic component of the optical signal back towards the optical fiber 106. In some embodiments, the polarization beam splitter 212 provides lower loss and better fabrication tolerance relative to systems that use a polarization splitter rotator.

The optical fiber 106 carries the transverse magnetic component back to the optical source 102 using a different core than the core 402 that was used to carry the optical signal emitted by the optical source 102. In the example of FIG. 4, the core 410 carries the transverse magnetic component back to the optical source 102. As the transverse magnetic component travels through the core 410, the polarization of the transverse magnetic component may change in a manner that is reciprocal to the polarization change that occurred to the optical signal as the optical signal traveled through the core 402.

The optical source 102 includes the photodiode 218 that receives the transverse magnetic component of the optical signal over the core 410. The photodiode 218 converts the transverse magnetic component into an electric signal. The photodiode 218 then communicates the electric signal to the polarization controller 210. The polarization controller 210 processes or analyzes the electric signal to determine how to adjust the polarization of the optical signal generated by the optical source 102. The polarization controller 210 may determine how to adjust the polarization of the optical signal so as to reduce, minimize, or eliminate the transverse magnetic component at the integrated circuit 104. For example, the polarization controller 210 may adjust the polarization of the optical signal until a voltage or current of the electric signal from the photodiode 218 is reduced below a threshold or is reduced to zero. In this manner, the system 100 automatically adjusts the polarization of the optical signal so as to compensate or correct for the polarization changes that occur in the optical fiber 106.

Figure 5:
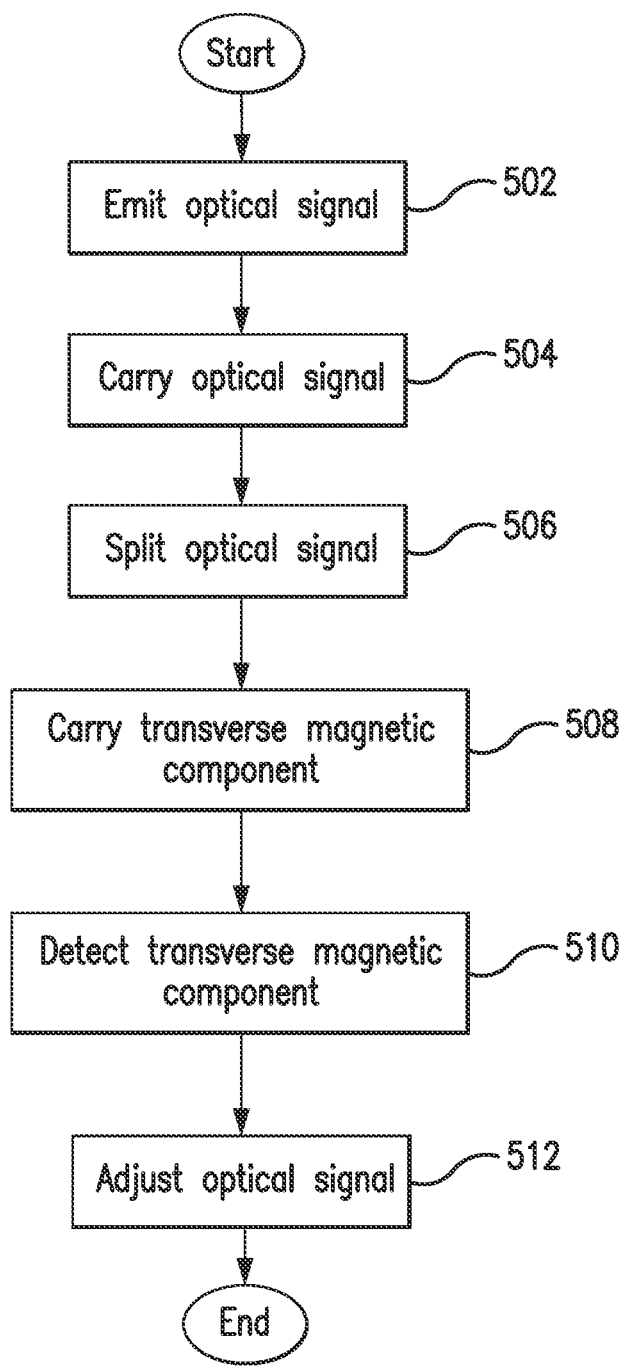
FIG. 5 is a flowchart of an example method performed in the system of FIG. 1.

FIG. 5 is a flowchart of an example method 500 performed in the system 100 of FIG. 1. In certain embodiments, various components of the system 100 perform the method 500. By performing the method 500, the system 100 automatically adjusts the polarization of an optical signal to reduce, minimize, or eliminate a transverse magnetic component of the optical signal that may be introduced by an optical fiber 106.

In block 502, the optical source 102 emits an optical signal. The optical source 102 includes the laser 202 and other optical components that generate and emit the optical signal onto an optical fiber 106. The optical fiber then carries the optical signal to the integrated circuit 104 in block 504. In some embodiments, the optical fiber 106 includes multiple cores 402, 404, 406, 408, and 410. One of the cores 402 may carry the optical signal to the integrated circuit 104. The optical fiber 106 may change the polarization of the optical signal as the optical signal travels through the optical fiber 106.

The polarization beam splitter 212 in the integrated circuit 104 receives the optical signal from the core 402. The polarization beam splitter 212 then splits the optical signal into its transverse electric and transverse magnetic components in block 506. The polarization beam splitter 212 directs the transverse electric component of the optical signal to other components, such as the transmitter 214. The polarization beam splitter 212 directs the transverse magnetic component of the optical signal back towards the optical fiber 106. In some embodiments, the polarization beam splitter 212 provides lower loss and better fabrication tolerance relative to systems that use a polarization splitter rotator.

The optical fiber 106 carries the transverse magnetic component back towards the optical source 102 in block 508. In certain embodiments, a different core 410 of the optical fiber 106 carries the transverse magnetic component back to the optical source 102. As a result, different cores 402 and 410 of the optical fiber 106 are used to carry the optical signal and the transverse magnetic component of the optical signal.

In block 510, the photodiode 218 detects the transverse magnetic component of the optical signal. For example, the photodiode 218 may receive the transverse magnetic component of the optical signal and generate an electric signal representing the transverse magnetic component. The photodiode 218 then communicates the electric signal to the polarization controller 210

In block 512, the polarization controller 210 adjusts the polarization of the optical signal generated or produced by the optical source 102. In some embodiments, the polarization controller 210 adjusts the polarization of the optical signal to reduce, minimize, or eliminate the transverse magnetic component of the optical signal at the integrated circuit 104. The polarization controller 210 may process or analyze the electric signal from the photodiode 218 to determine how to adjust the polarization of the optical signal so that the transverse magnetic component is reduced, minimized, or eliminated. The polarization controller 210 may then make the adjustment to the optical signal before the optical signal is emitted onto the optical fiber 106. In this manner, the polarization controller 210 automatically adjusts the polarization of the optical signal to compensate or correct for polarization changes that occur over the optical fiber 106, in certain embodiments.

Figure 6:
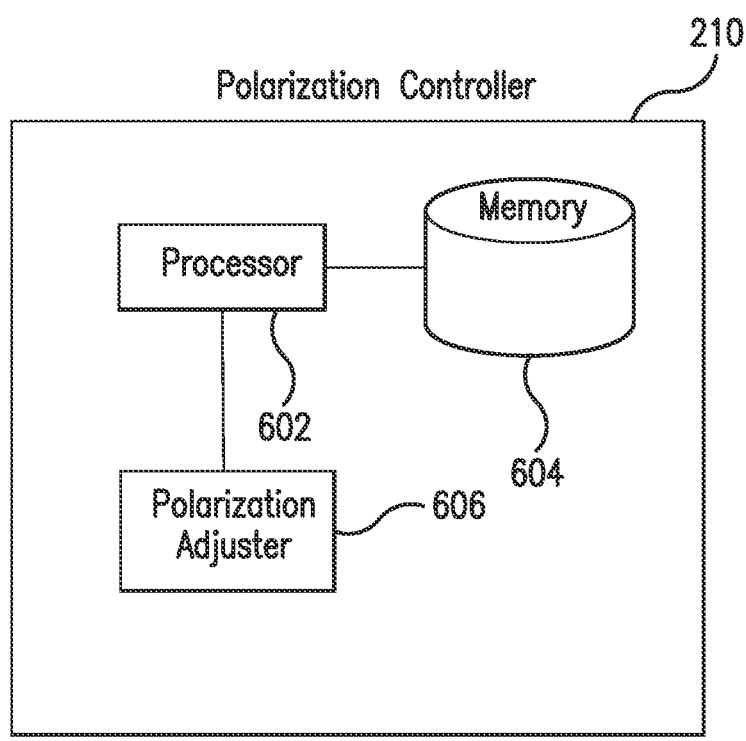
FIG. 6 illustrates an example polarization controller in the system of FIG. 1.

FIG. 6 illustrates an example polarization controller 210 in the system 100 of FIG. 1. As seen in FIG. 6, the polarization controller 210 includes a processor 602, a memory 604, and a polarization adjuster 606. Generally, the processor 602 and the memory 604 are configured to control the operation of the polarization controller 210.

The processor 602 is any electronic circuitry, including, but not limited to one or a combination of microprocessors, microcontrollers, application specific integrated circuits (ASIC), application specific instruction set processor (ASIP), and/or state machines, that communicatively couples to memory 604 and controls the operation of the polarization controller 210. The processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 602 may include other hardware that operates software to control and process information. The processor 602 executes software stored on the memory 604 to perform any of the functions described herein. The processor 602 controls the operation and administration of the polarization controller 210 by processing information (e.g., information received from the photodiode 218, optical fiber 106, and memory 604). The processor 602 is not limited to a single processing device and may encompass multiple processing devices.

The memory 604 may store, either permanently or temporarily, data, operational software, or other information for the processor 602. The memory 604 may include any one or a combination of volatile or non-volatile local or remote devices suitable for storing information. For example, the memory 604 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 604, a disk, a CD, or a flash drive. In particular embodiments, the software may include an application executable by the processor 602 to perform one or more of the functions described herein.

The polarization adjuster 606 adjusts the polarization of an optical signal based on control signals from the processor 602. For example, the processor 602 may receive an electric signal from the photodiode 218 of the optical source 102. The processor 602 may process or analyze the electric signal to determine the size or magnitude of a transverse magnetic component of an optical signal (e.g., caused by the optical fiber 106). The processor 602 may then determine adjustments to be made to the polarization of the optical signal to reduce, minimize, or eliminate the transverse magnetic component. The processor 602 may generate or produce a control signal to the polarization adjuster 606. The polarization adjuster 606 then adjusts the polarization of the optical signal as instructed by the processor 602, which may reduce the transverse magnetic component of the optical signal. The polarization adjuster 606 may include any suitable components for adjusting the polarization of the optical signal as instructed by the processor 602.

Generally, the polarization adjuster 606 may include one or more stages that adjust different aspects of the polarization of an optical signal. For example, the polarization adjuster 606 may include a first stage that rotates the optical signal. The polarization adjuster 606 may also include a second stage, following the first stage, that adjusts a minor axis of the optical signal. Each of these stages may include any suitable components for rotating an optical signal or for reducing a minor axis of the optical signal. Examples polarization adjusters 606 with different numbers of stages are described using FIGS. 7A, 7B, 8A, and 8B.

Figure 7A:
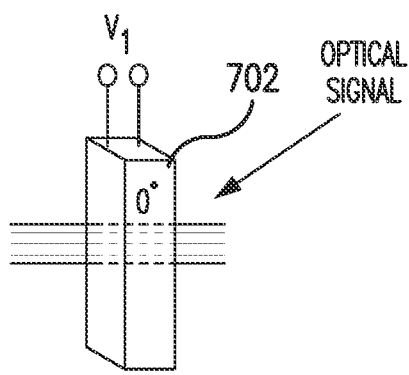
FIGS. 7A and 7B illustrate example polarization adjusters in the system of FIG. 1.

FIG. 7A illustrates an example polarization adjuster 606 in the system 100 of FIG. 1. As seen in FIG. 7A, the polarization adjuster 606 includes a liquid crystal 702. The optical signal generated by the optical source 102 is directed into the liquid crystal 702. The liquid crystal 702 rotates the optical signal according to a voltage $V_1$ applied to the liquid crystal 702. In some embodiments, the processor 602 of the polarization controller 210 adjusts the voltage $V_1$ applied to the liquid crystal 702. By varying the voltage $V_1$, the amount of rotation introduced by the liquid crystal 702 changes. In this manner, the polarization adjuster 606 may rotate the optical signal to reduce, minimize, or eliminate the transverse magnetic component.

Figure 7B:
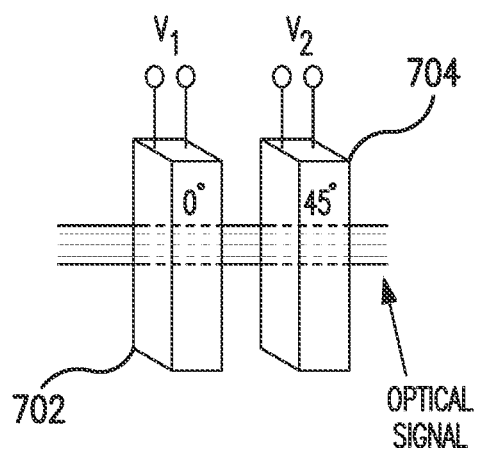

FIG. 7B illustrates an example polarization adjuster 606 in the system 100 of FIG. 1. As seen in FIG. 7B, the polarization adjuster 606 includes the liquid crystal 702 and a liquid crystal 704. The optical signal produced by the optical source 102 is directed into the liquid crystals 702 and 704. As discussed previously, the liquid crystal 702 rotates the optical signal according to a voltage $V_1$ applied to the liquid crystal 702. The liquid crystal 704 adjusts a minor axis based on a voltage $V_2$ applied to the liquid crystal 704 to recover linearity in the optical signal. For example, if the processor 602 of the polarization controller 210 determines that there is a minor axis in the optical signal, then the processor 602 may apply a voltage $V_2$ to the liquid crystal 704 such that the liquid crystal 704 reduces, minimizes, or eliminates that minor axis in the optical signal to recover linearity in the optical signal.

Figure 8A:
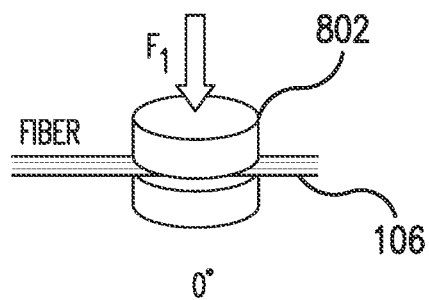
FIGS. 8A and 8B illustrate example polarization adjusters in the system of FIG. 1.

FIG. 8A illustrates an example polarization adjuster 606 in the system 100 of FIG. 1. In the example of FIG. 8A, the polarization adjuster 606 includes a Piezoelectric actuator 802. The Piezoelectric actuator 802 may apply an adjustable force $F_1$ to the optical fiber 106. The force $F_1$ may pinch the optical fiber 106 such that the polarization of an optical signal in the optical fiber 106 is adjusted. The processor 602 of the polarization controller 210 may apply a particular voltage to the Piezoelectric actuator 802 to adjust the magnitude of the force $F_1$ applied by the Piezoelectric actuator 802. For example, the processor 602 may increase the voltage applied to the Piezoelectric actuator 802 to increase an amount of expansion in the Piezoelectric actuator 802, which increases the force $F_1$ applied to the fiber 106. As another example, the processor 602 may reduce an amount of voltage applied to the Piezoelectric actuator 802 to reduce an amount of expansion in the Piezoelectric actuator 802, which reduces the force $F_1$ applied by the Piezoelectric actuator 802. In this manner, the amount of force $F_1$ applied to pinch the fiber 106 may be adjusted to adjust the polarization of the optical signal traveling through the optical fiber 106.

Figure 8B:
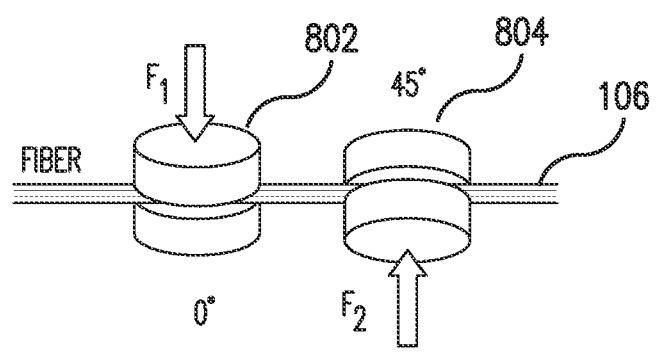

FIG. 8B illustrates an example polarization adjuster 606 in the system 100 of FIG. 1. As seen in FIG. 8B, the polarization adjuster 606 includes the Piezoelectric actuator 802 and a Piezoelectric actuator 804. The Piezoelectric actuator 802 applies the adjustable force $F_1$ to pinch the optical fiber 106. The Piezoelectric actuator 804 applies an adjustable force $F_2$ to pinch the optical fiber 106. The orientation of the Piezoelectric actuator 804 causes the force $F_2$ to adjust a minor axis in the optical signal propagating through the optical fiber 106 to recover linearity in the optical signal. When the processor 602 of the polarization controller 210 determines that the optical signal includes a minor axis, the processor 602 may adjust a voltage applied to the Piezoelectric actuator 804 to adjust the force $F_2$ applied by the Piezoelectric actuator 804. In this manner, the processor 602 may reduce, minimize, or eliminate the minor axis in the optical signal to recover linearity in the optical signal.

Additionally, the polarization adjuster 606 may control the polarization in multiple cores of a multi-core optical fiber. As a result, multiple cores may be controlled by a single feedback signal or loop (e.g., the transverse magnetic component of the optical signal). For example, a single liquid crystal (as shown in FIG. 7A) or a single Piezoelectric actuator (as shown in FIG. 8A) may add the needed retardation to more than one core of the multicore fiber. As another example, two liquid crystals (as shown in FIG. 7B) or two Piezoelectric actuators (as shown in FIG. 8B) may add the needed retardation to more than one more of the multicore fiber.

In summary, the optical source 102 compensates for polarization changes in the optical fiber 106 that is used to carry optical signals from the optical source 102 to the integrated circuit 104. The integrated circuit 104 includes a polarization beam splitter 212 that splits the optical signal into its transverse electric and transverse magnetic components. The transverse magnetic component is then used by the optical source 102 to determine how to adjust the optical signal so as to reduce, minimize, or eliminate the transverse magnetic component. In this manner, the optical system 100 self-corrects for changes to the polarization of the optical signal that occur in the optical fiber 106 (e.g., because a non-polarization maintaining fiber was used rather than a polarization maintaining fiber), in certain embodiments In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s).

In view of the foregoing, the scope of the present disclosure is determined by the claims that follow.

We claim:

1. A system comprising:
    an optical source arranged to emit an optical signal;
    an integrated circuit comprising a first polarization beam splitter and a mirror;
    an optical fiber arranged to carry the optical signal from the optical source to the integrated circuit, wherein the first polarization beam splitter is arranged to split the optical signal at the integrated circuit into a transverse electric component and a transverse magnetic component, wherein the mirror is arranged to reflect the transverse magnetic component of the optical signal through the optical fiber to the optical source;
    a second polarization beam splitter arranged to direct the transverse magnetic component to a photodiode, wherein the photodiode is arranged to convert the transverse magnetic component into an electrical signal; and
    a polarization controller configured to adjust, based on the electrical signal, the optical signal emitted from the optical source such that the transverse magnetic component is reduced.

2. The system of claim 1, wherein the polarization controller comprises a first stage arranged to rotate a polarization of the optical signal emitted from the optical source.

3. The system of claim 2, wherein the polarization controller comprises a second stage arranged to recover linearity in the polarization of the optical signal emitted from the optical source.

4. The system of claim 1, wherein the polarization controller comprises a liquid crystal arranged to rotate a polarization of the optical signal emitted from the optical source.

5. The system of claim 1, wherein the polarization controller comprises a piezoelectric actuator arranged to rotate a polarization of the optical signal emitted from the optical source.

6. A system comprising:
an optical source;
an integrated circuit;
an optical fiber arranged to carry an optical signal emitted from the optical source to the integrated circuit through a first core of the optical fiber, wherein the optical signal experiences a first polarization change while traveling through the first core, wherein a transverse magnetic component of the optical signal is split from a transverse electric component of the optical signal, wherein a second core of the optical fiber is arranged to carry the transverse magnetic component of the optical signal from the integrated circuit back to the optical source, wherein the transverse magnetic component experiences a second polarization change reciprocal to the first polarization change while traveling through the second core; and
a polarization controller configured to adjust, based on the transverse magnetic component of the optical signal, the optical signal emitted from the optical source such that the transverse magnetic component is reduced and such that the first polarization change is compensated.

7. The system of claim 6, wherein the integrated circuit comprises a polarization beam splitter arranged to split the optical signal at the integrated circuit into the transverse electric component and the transverse magnetic component.

8. The system of claim 6, further comprising a photodiode arranged to convert the transverse magnetic component of the optical signal into an electric signal, and wherein the polarization controller adjusts the optical signal emitted from the optical source based on the electric signal.

9. The system of claim 6, wherein the polarization controller comprises a first stage arranged to rotate a polarization of the optical signal emitted from the optical source.

10. The system of claim 9, wherein the polarization controller comprises a second stage arranged to recover linearity in the polarization of the optical signal emitted from the optical source.

11. The system of claim 6, wherein the polarization controller comprises a liquid crystal arranged to rotate a polarization of the optical signal emitted from the optical source.

12. The system of claim 6, wherein the polarization controller comprises a piezoelectric actuator arranged to rotate a polarization of the optical signal emitted from the optical source.

13. A method comprising:
emitting, by an optical source, an optical signal, wherein the optical source comprises a polarization controller;
carrying, by an optical fiber, the optical signal from the optical source to an integrated circuit, wherein the integrated circuit comprises a first polarization beam splitter and a mirror;
splitting, by the first polarization beam splitter, the optical signal at the integrated circuit into a transverse electric component and a transverse magnetic component;
reflecting, by the mirror, the transverse magnetic component of the optical signal through the optical fiber to the optical source;
directing, by a second polarization beam splitter, the transverse magnetic component to a photodiode;
converting, by the photodiode, the transverse magnetic component into an electrical signal; and
adjusting, by the polarization controller and based on the electrical signal, the optical signal emitted from the optical source such that the transverse magnetic component is reduced.

14. The method of claim 13, further comprising rotating, by a first stage of the polarization controller, a polarization of the optical signal emitted from the optical source.

15. The method of claim 14, further comprising recovering, by a second stage of the polarization controller, linearity in the polarization of the optical signal emitted from the optical source.

16. The method of claim 13, further comprising rotating, by a liquid crystal of the polarization controller, a polarization of the optical signal emitted from the optical source.

* * * * *